United States Patent Office.

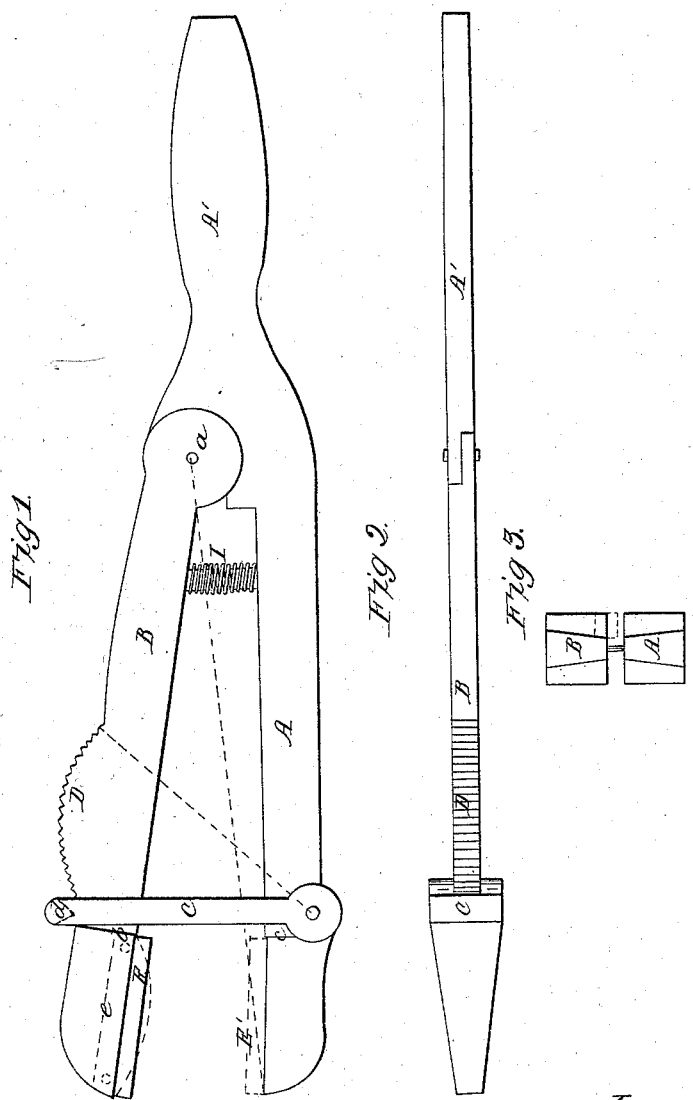

JOHN S. KALB, OF FOSTORIA, OHIO.

Letters Patent No. 67,987, dated August 20, 1867.

---

IMPROVEMENT IN WRENCH AND PRUNING-SHEARS COMBINED.

---

The Schedule referred to in these Letters Patent and making part of the same.

---

TO ALL WHOM IT MAY CONCERN:

Be it known that I, JOHN S. KALB, of Fostoria, in the county of Seneca, and State of Ohio, have invented certain new and useful Improvements in Pruning-Shears and Wrench Combined; and I do hereby declare that the following is a full and complete description of the same, reference being had to the accompanying drawing, making a part of this specification, in which—

Figure 1 is a side view.

Figure 2 is a top view

Figure 3 is a detached view that will be referred to in the description.

Like letters of reference refer to like parts in the views.

This implement consists of the two jaws, A B, the jaw A being a part of the shank or handle A', and the jaw B pivoted to said shank at $a$. These jaws are of the form represented in the drawing, forming shoulders at $b c$, and being tapering towards the ends, as shown in figs. 2 and 3. C is a stirrup pivoted to the lower jaw A, as shown, and extending up over the jaw B, the under side being V-shaped, as indicated by the dotted lines $d$, fig. 1, so as to fit into the curved rack D. This stirrup is prevented from being pushed off the end of the jaw by means of the shoulder $b$, above referred to. E represents a blade inserted in the edge of the jaw, which can be made either straight or curving, as indicated. A blade can also be placed in the lower jaw, as indicated by the dotted lines E', so as to have two knives instead of one. I is a spring placed between the jaws for the purpose of forcing them apart when the hand is removed from them. When these shears are to be used the stirrup can be secured in place by means of a thumb-screw, which can be attached at one end, and by this means the stirrup will form a gauge for trimming hedges, &c. Fig. 3 is an end view of the jaws with the knives attached, and if desired blades can be pivoted to the side of the jaws, indicated by the dotted lines $e$, figs. 1 and 3, and thus have the cutting edge on the outside.

This implement can be used as a screw-wrench by simply removing the blades E E', or if they are attached to the side of the jaw one of the rivets can be removed and the blade thrown back out of the way, thus avoiding the necessity of removing them. When this is done the stirrup must be adjusted by moving it on the rack D, thus bringing the jaws nearer to or farther from each other, as desired, according to the size of the nut. By this means the implement can be used for pruning-shears, or a wrench, as may be desired.

What I claim as my improvement, and desire to secure by Letters Patent, is—

1. The jaws A B, rack D, in combination with the spring I and stirrup C, combined and operating conjointly, substantially as and for the purposes set forth.

2. I claim combining the pivoted jaws A B and spring I with one or more movable blades or cutters, arranged as and for the purpose set forth.

JOHN S. KALB.

Witnesses:
J. H. BURRIDGE,
R. E. MIX.